(12) United States Patent
Christensen (10) Patent No.: US 6,662,193 B1
(45) Date of Patent: Dec. 9, 2003

(54) METHODS AND SYSTEMS FOR MANIPULATING A DATABASE THROUGH PORTABLE DATA ENTRY DEVICES

(75) Inventor: Charles L. Christensen, South Ogden, UT (US)

(73) Assignee: CG4 Solutions, Inc., Centerville, UT (US)

( * ) Notice: Subject to any disclaimer, the term of this patent is extended or adjusted under 35 U.S.C. 154(b) by 145 days.

(21) Appl. No.: 09/587,143

(22) Filed: Jun. 2, 2000

(51) Int. Cl.[7] ............................................. G06F 17/30
(52) U.S. Cl. ...................................... 707/104.1
(58) Field of Search .............................. 707/1, 10, 100, 707/101, 102, 104.1; 345/555; 358/442; 704/277; 701/200, 201; 705/14

(56) References Cited

U.S. PATENT DOCUMENTS

| | | | | |
|---|---|---|---|---|
| 5,742,905 A | * | 4/1998 | Pepe et al. | 455/461 |
| 6,064,943 A | * | 5/2000 | Clark et al. | 702/2 |
| 6,072,598 A | * | 6/2000 | Tso | 358/442 |
| 6,305,603 B1 | * | 10/2001 | Grunbok et al. | 235/379 |

* cited by examiner

Primary Examiner—Diane D. Mizrahi
Assistant Examiner—Apu M Mofiz
(74) Attorney, Agent, or Firm—Workman Nydegger (57) ABSTRACT

Systems and methods for gathering and updating inventory data within a database through use of a hand-held technology. The method includes the step of collecting a plurality of parameters of data having a first data structure responsive to a user input via the hand-held technology. The plurality of data parameters are gathered and stored on the hand-held technology during inventory counting or replenishment stocking and, once inventory counting or replenishment stocking is completed, the data is prepared for delivery to the database. As such, the computer-executed method and computer program product further entails manipulating the plurality of parameters of data having the first data structure into a second data structure capable of being transceived by a database management system of the database. Once this occurs, the computer-executed method and associated computer program product requires delivery of the data in the second data structure to the database for updating of the data therein.

51 Claims, 4 Drawing Sheets

METHODS AND SYSTEMS FOR MANIPULATING A DATABASE THROUGH PORTABLE DATA ENTRY DEVICES

BACKGROUND OF THE INVENTION

1. The Field of the Invention

The present invention generally relates to electronic communication between multiple hardware and software modules. More specifically, the present invention relates to methods and systems for manipulating inventory data through use of personal digital assistants and software applications.

2. The Prior State of the Art

With the advances in technology, individuals and business organizations continually seek to obtain and achieve automated solutions to fulfilling their various needs, such as manipulation of business data, transfer of data between various locations, and the like. One such advance is the computer network that allows numerous users to connect or interface one with another. Unfortunately, typical computer networks require each computer to be physically connected one to another thereby limiting the usefulness and access to the computer network by those individuals who are distant from or working away from the computer network. This is especially evident with respect to the increase of usage of personal digital assistance (PDA) or hand held technology (HHT), such as palm computers, organizers, wireless telephones, and the like.

Since both individuals and organizations desire access to a computer network via PDAs and HHTs, it is necessary for each PDA or HHT to communicate and interface with existing software applications and hardware devices. There are, however, problems with PDAs and HHTs communicating with existing business applications such as enterprise resource planning tools (ERP). The particular formatting and dialog interface between mainframe or large based database systems, such as Peoplesoft and smaller PDAs and HHTs, is difficult. This is especially so in the area of inventory counting and replenishing.

Currently, during a stock count activity, an individual manually counts the quantity of products "on hand" in a given location and/or the product "needed" to replenish a given location to the desired quantity. Once the information has been gathered, an individual then enters the information into a computer system that connects directly to a warehouse, produces an invoice, or is delivered to a business supplier. As such, during inventory counting and replenishing activities the amount of work performed is effectively doubled by transcribing the information written down and inputting the information into the computer. In addition, significant errors may occur during transcription and/or data entry of the inventory data.

Numerous attempts have been made to automate the inventory count and replenishing activities. For example, in one computerized inventory process, a user inputs the required data by either scanning or typing the Universal Product Code (UPC) and inputting the desired quantity of the product. The hand held terminal then is placed within a cradle which then transmits the data to a database. Unfortunately, to modify the available stock numbers within the UPC it is necessary to reprogram each individual PDA thereby requiring a significant time and cost to the business.

Additionally, traditional automated inventory systems are system specific in that they are unique to the particular requirements of a particular business or entity with little overlap to other various inventory stock taking systems and ERPs. Therefore, it is desirable for an inventory counting replenishment stocking system that is capable of interfacing with existing software database applications and ERPs in an efficient manner, while being capable of being updated through use of various PDA and HHT's in a simple and efficient manner.

Therefore, there is a need for an inventory counting and replenishment stocking system, with associated hardware and software components and modules that are capable of interfacing with various ERP's through a variety of PDAs or HHTs in an efficient and cost effective manner, while being capable of allowing updating of the information contained within the PDAs and HHTs in a simple and quick manner.

OBJECTS AND SUMMARY OF THE INVENTION

It is an object of one embodiment of the present invention to manipulate data received by a personal digital assistant, such that the received data may update data contained within a database.

Still yet another object of one embodiment of the present invention is to allow updating of numerous databases having various configurations through use of a personal digital assistant.

Yet another object of one embodiment of the present invention is to allow direct access to the data contained within a database without passing through existing database management systems or enterprise resource planning applications.

Another object of one embodiment of the present invention is to manipulate data in different data structure forms; so that data obtained by a personal digital assistance may be received by a database.

It is another object of one embodiment of the present invention to efficiently gather inventory data in a simple and cost effective manner.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects of the present invention will become more fully apparent from the following description and appended claims, or may be learned by the practice of the invention as set forth hereinafter.

As disclosed previously, one of the stumbling blocks to using personal digital assistants (PDA) to efficiently update the data stored in a database is the incompatibility existing between the PDA and either the existing database and/or enterprise resource planning application (ERP). Additionally, the data stored within the database is typically accessed through a database management system that may or may not be compatible with the PDAs attempting to access the database. To achieve the foregoing objects, and in accordance with the invention as embodied and broadly described herein, systems and methods for gathering and updating data within a database through use of a PDA are disclosed.

One of the modules implemented by one embodiment of the present invention is an interface module, which is capable of creating, reading, accessing, updating, deleting, selecting, and modifying information stored in a database directly without interfacing with the database management system or the ERP.

Another module of the present invention includes a manipulation module that transmits information between the database and a PDA module. The transmission of data between the database and the manipulation module may occur through either the database management system and the ERP or the interface module depending on the operation of the database, database management system, and ERP. Therefore, the interface module allows the manipulation module to be compatible with databases that would otherwise be inaccessible.

The PDA module executes on the PDA and is capable of bi-directional communication with the manipulation module. One function of the PDA module is to allow a user to update the database data. The PDA module also prepares the collected information such that is may be accepted and stored by the database. The data may, therefore, be formatted and manipulated according to the particular structure of the database. The PDA module then transmits the collected data to the manipulation module, which then transmits the information to the database. The PDA module is also capable of receiving information from the manipulation module such that it may be updated or altered through the PDA.

In this manner, the present invention is capable of using PDA's to effectively update and maintain a database. The present invention is capable of interfacing with a variety of different databases and eliminates the need to re-enter the data by hand.

BRIEF DESCRIPTION OF THE DRAWINGS

In order that the manner in which the above recited and other advantages and objects of embodiments of the invention are obtained, a more particular description of the invention briefly described above will be rendered by reference to specific embodiments thereof that are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention relates to updating and gathering data through the use of personal digital assistants (PDA). The present invention allows a user to select data from a database in a controlled manner so that a complete data listing is not installed on the PDA. Furthermore, the present invention allow various types of PDAs and other hand-held technologies (HHTs) (collectively PDA), to interface with various enterprise resource planning tools (ERP) and/or circumvent the ERP, to allow a more efficient and cost effective updating process of the data with the database. The embodiments of the present invention may comprise any number of special purpose or general-purpose computers including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
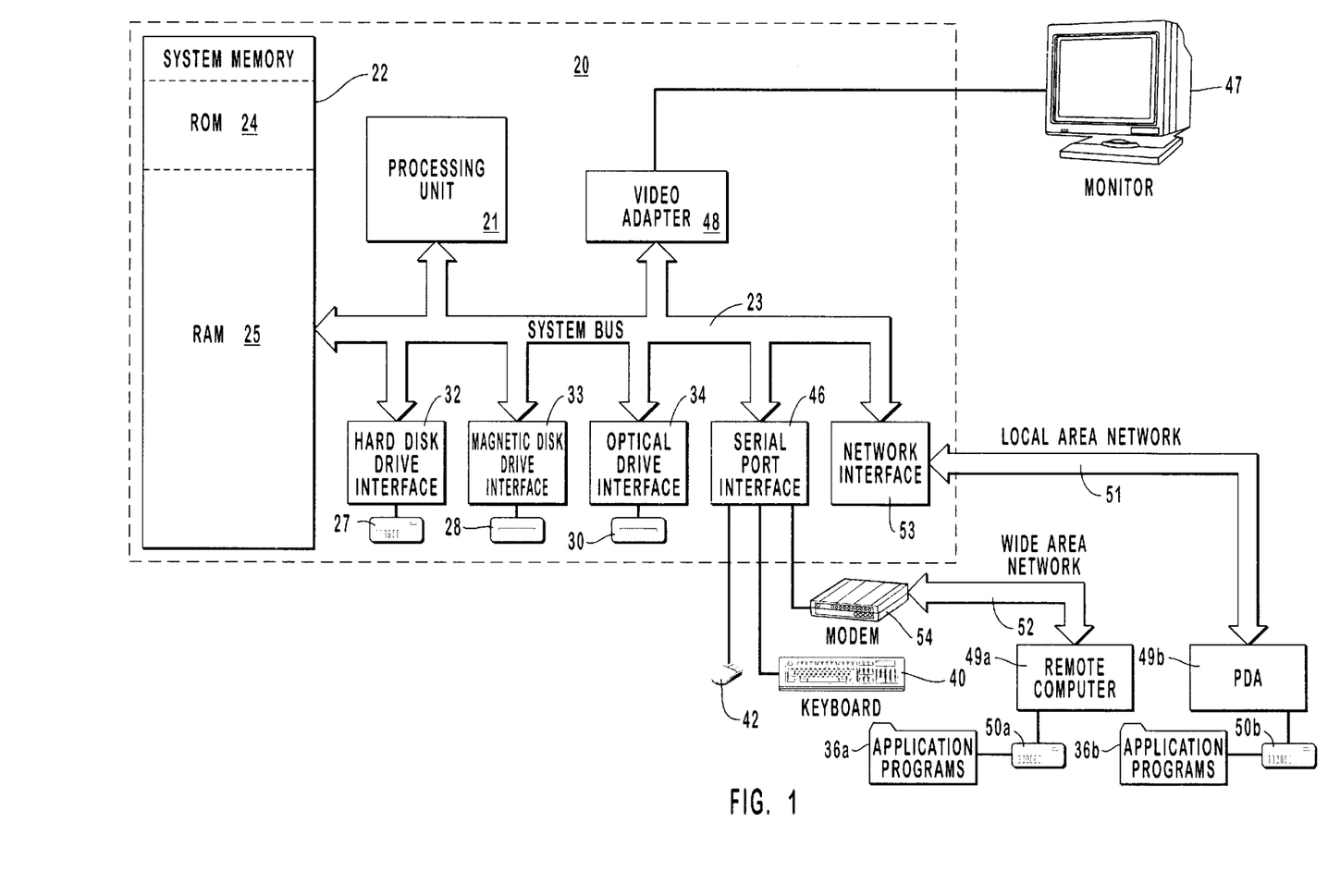
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose-computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. As is known by one skilled in the art, the system memory may include read only memory (ROM) 24 and random access memory (RAM) 25. Furthermore, a basic input/output system (BIOS), containing the basic routines that help transfer information between elements within computer 20, such as during start-up, may be stored in the ROM 24. With respect to the RAM 25, various operating systems, application programs, program data, and other program modules may be stored therein, as commonly known by one skilled in the art.

The computer 20 may also include various drive interfaces that are capable of reading different data media. For example, computer 20 may include a magnetic hard disk drive 27 for reading from and writing to a magnetic hard disk (not shown), a magnetic disk drive 28 for reading from or writing to a removable magnetic disk (not shown), and an optical disk drive 30 for reading from or writing to removable optical disk (not shown) such as a CD-ROM or other optical media. The magnetic hard disk drive 27, magnetic disk drive 28, and optical disk 30 drive are connected to the system bus 23 by appropriated drive interfaces 32, 33, and 34, respectively. The drives and their associated computer-readable media provide nonvolatile storage of computer-executable instructions, data structures, program modules and other data for the computer 20. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, and the like.

Program code means comprising one or more program modules may be stored on the hard disk, magnetic disk, optical disk, ROM 24, or RAM 25, including an operating system, one or more application programs, other program modules, and program data. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b, one of which is illustrated as a PDA. Remote computers 49a and 49b may each be another personal computer, a network PC, a peer device, or other common network node, and typically includes many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

The present invention is discussed herein with reference to a new inventory and stock reconciliation system; however it may be appreciated that the systems and methods of the present invention may be implemented and utilized in various other situations and systems including, but not limited to, retrofitting an existing inventory and stock counting and reconciliation system. Additionally, it may be appreciated that the present invention is not limited to use with an inventory system but may be used in various other systems.

Figure 2:
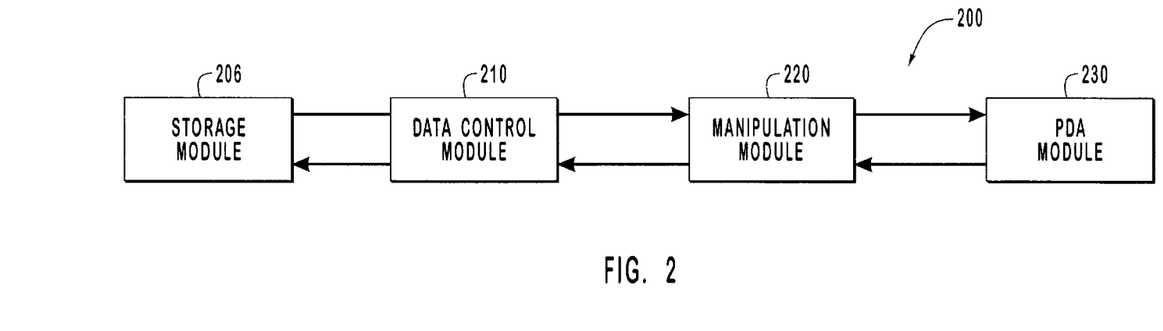
FIG. 2 is a schematic representation of one embodiment of the system of the present invention.

FIG. 2 is a block diagram illustrating a system implementing one embodiment of the present invention. As shown, system 200 includes a storage module 206 that communicates with a data control module 210. Typically, storage module 206 includes database hardware and/or software modules that maintain the inventory data in various fields, records, and files that has a data form termed storage data structure. The inventory data may include but is not limited to, stock identifiers, quantities, locations, and the like. As such, storage module 206 may take various configurations as known by one skilled in the art. Additionally, storage module 206 is one structure capable of performing the function of storage means for maintaining data in a database data structure.

Communicating with storage module 206 is data control module 210. Data control module 210 acts as an intermediary handling module that allows data to be communicated to the various internal modules of storage module 206. As such, data control module 210 may prepare the data transmitted between storage module 206 and manipulation module 220.

Manipulation module 220 may retrieve data from and transmit data to data control module 210, which in turn delivers and receives data from storage module 206. As discussed herein, the operation of either transmitting data and/or receiving data, in various forms and types, shall be termed collectively as "transceiving." Manipulation module 220 is configured to convert the data maintained by storage module 206 to a data structure compatible with PDA module 230, where PDA module 230 transceives data having a PDA data structure.

In addition to the functionality described above, manipulation module 220 may compare the data transmitted between PDA module 230 and manipulation module 220 to reconcile the data transfer of system 200. Manipulation module 220, therefore, may include the structure and functionality of computer 20 with associated application programs 36, or system memory 22 to store the application programs 36 and updated inventory data from PDA module 230.

Interfacing with manipulation module 220 is PDA module 230 that allows a user to gather the data used to update the specific entries within storage module 206. For example, PDA module 230 may include a PDA or hand-held device (not shown) that incorporates the structure and functionality of computer 20, including the necessary application programs 36 and system memory 22.

Through the configuration of system 200 depicted in FIG. 2, one or more PDA's may be used to manipulate, change, or modify the data contained within storage module 210. Additionally, system 200 of the presently illustrated embodiment has the further advantage of eliminating the need for matching the data format of PDA module with storage module 206 since manipulation module 220 ensures that storage module 206 is compatible with PDA module 230.

Generally, each of the modules, 206, 210, 220, and 230, may be incorporated within various types of computer 20 and remote computers 49*a*, 49*b*, as depicted in FIG. 1. Each module 206, 210, 220, and 230, therefore, may include system memory 22 and storage devices 50*a* and 50*b*, while optionally including hard disk drive 27, magnetic disk drive 28, optical disk drive 30, and associated interfaces 32, 33, and 34.

As shown in FIG. 2, storage module 206 communicates with data control module 210, that in turn communications with manipulation module 220. Subsequently, manipulation module 220 communicates with PDA module 230. It may be appreciated by one skilled in the art, that depending on the particular configuration of system 200, not all modules 206, 210, 220, and 230 may be included within system 200. Additionally, each module 206, 210, 220, and 230 may communicate with other modules of system 200 that are appropriate. For example, storage module 206 may communicate with data control module 210 that communicates directly with PDA module 230, where PDA module 230 includes the functionality of manipulation module 220 therein. Alternatively, in another configuration, storage module 206 may communicate directly with PDA module 230 such that storage module 206 incorporates the functionality of data control module 210 and/or manipulation module 220, or alternatively PDA module 230 incorporates the functionality of data control module 210 and/or manipulation module 220. As such, system 200 may have various other configurations and other modules as appropriate and known by one skilled in the art.

Figure 3:
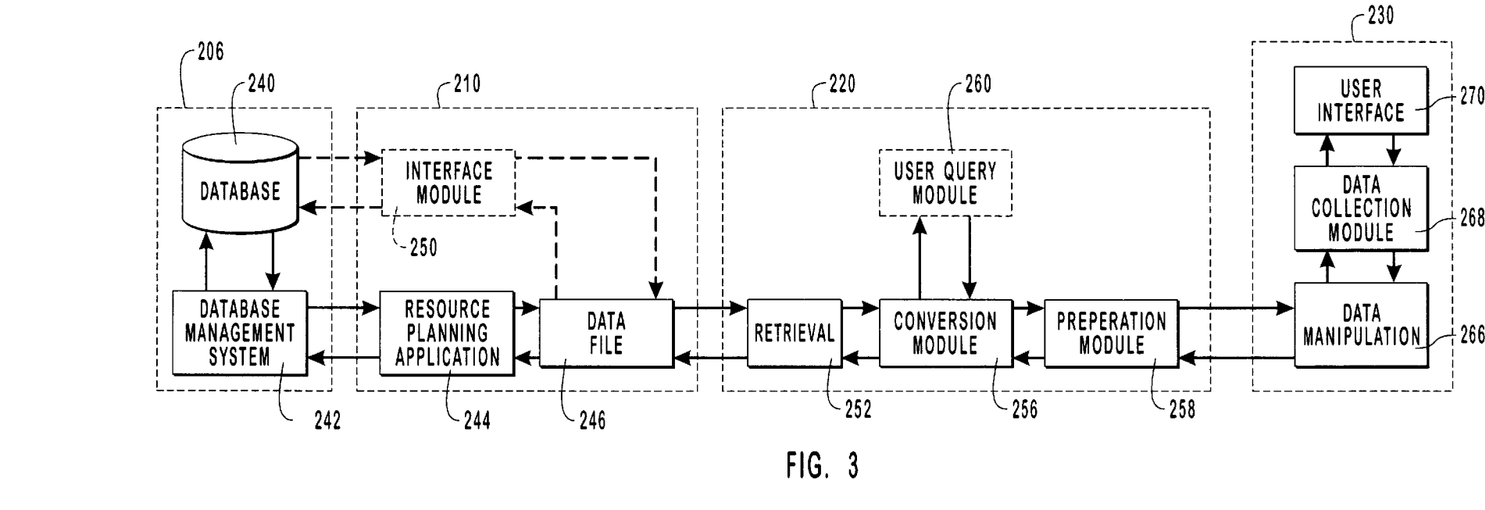
FIG. 3 is a schematic representation of the system depicted in FIG. 2.

Referring now to FIG. 3, which is a more detailed schematic of one embodiment of the present invention. Storage module 206, in one illustrative embodiment of the present invention, includes a database 240, which maintains the data in the storage data structure. To access database 240, a user hardware module or software module interfaces with a database management system 242. Database management system 242 includes multiple software applications that perform the function of obtaining and retrieving data from database 240. Database 240 and database management system 242 may have various architectures, such as but not limited to, relational, network, flat, and hierarchical databases and database management systems. For illustrative purposes only, the present invention disclosed herein will be described with respect to a relational database 240 and a relational database management system 242.

In accordance with another aspect of the present invention, communicating with storage module 206 is data control module 210. Data control module 210 includes a enterprise resource planning application 244, a data file 246 that may be transferred between data control module 210 and manipulation module 220 during processing operations, such as a batch operation. Enterprise resource planning application 244, in one embodiment, may be a software application that allows a business to more fully manage the various aspects of the business, such as sales, inventory, marketing, planning, manufacturing, and the like. For example, enterprise resource planning application 244 may take the form of a Peoplesoft application. Generally, enterprise resource planning application 244 is a "front end" user interface to storage module 206. As such, although shown as being included as part of data control module 210, it may be appreciated by one skilled in the art, that enterprise resource planning application 244 may be incorporated within storage module 206.

Data file 246 usually contains the data transceived between storage module 206 and manipulation module 220 during data updating or processing. Data file 246, therefore, in one embodiment is a file readable by database 240 and may have various file types, including, but not limited to ASCII, binary, and the like. Alternatively, data file 246 may take the form of an object with associated structure, data, and actions that may be performed on the data.

In general, many existing databases 240 and databases management systems 242 are capable of generating data file 246 or providing the appropriate application programming interface (API) that allows direct communication with database management system 242 and database 240 via enterprise resource planning application 244. In some instances, however, enterprise resource planning application 244 is incapable of generating data file 246, and thus data control module 210, and more specifically data file 246 communicates with an interface module 250.

Interface module 250, shown in dotted lines, circumvents database management system 242 and enterprise resource planning application 244 and communicates the data to and from database 240, while generating data file 246. Interface module 250 may be configured for a variety of different databases 240, to thereby circumvent the need to interface with database management system 242 and enterprise resource planning application 244.

As previously described, storage module 206, incorporates database 240 and database management system 242, while data control module 210 incorporates data file 246 and interface module 250. It may be appreciated by one skilled in the art, however, that storage module 206 may include the modules and files of data control module 210, such as for example only interface module 250. As such, interface module 250 may optionally be dependent on the particular configuration of the hardware and/or software associated with database management system 242, database 240, and/or enterprise resource planning application 244. The specific configurations of storage module 206 and data control module 210 and each of the associated software and hardware components may be incorporated within one or more workstations, PDAs, or other hardware device, as appropriate and known in the art.

Referring again to FIG. 3, communicating with data control module 210 is manipulation module 220. Manipulation module 220 includes a retrieval module 252 that verifies when data file 246 contains data, retrieves data file 244, and transmits the data contained within file 244 to a conversion module 256.

As such, retrieval module 252, in one embodiment, may include the necessary hardware and/or software modules and components to compress and decompress the data transceived between storage module 206 and manipulation module 220. Additionally, retrieval module 252 may encrypt and decrypt data file 246 as needed.

In one embodiment, conversion module 256 manipulates the data and converts it from a storage data structure to a PDA structure compatible with PDA module 230. As such, conversion module 256 may have various software and/or hardware components based upon the different types of PDA module 230, and associated hardware and/or software used in system 250. For example, in another embodiment of the present invention, conversion module 256 and/or manipulation module 220 may incorporate a database (not shown) and database management system (not shown) that stores the data transceived between storage module 210 and PDA module 230. As such, the integrated database maintains a list of fields, records, and/or files representative of the data requested and updated during use of PDA module 230 and system 200. The data held with the optional database may have a similar structure as that of database 240, however one skilled in the art may appreciate that the optional database may have a differing hardware and/or software configuration with an alternate data structure.

Manipulation module 220 further may optionally include a user query module 260. User query module 260 allows a user or other hardware and/or software modules to analyze the process performed by system 200, such as inventory count and reconciliation of inventory data. Additionally, user query module 260 may allow a user to print updated inventory bar codes, provide database cleanup operations, provide voice recognition, provide security to database 240, evaluate staff performance, generate reports and statistical information regarding the procedures and performance of those individuals performing the inventory or stock verification, and the like. One skilled in the art may identify various other characteristics and functions that may be performed by user query module 260.

Data manipulated or formatted by conversion module 256 passes through a data preparation module 258 that may have a similar configuration as retrieval module 252. Generally, preparation module 258 may transcribe data, compress and decompress data, encrypt and decrypt data, and the like.

Data prepared by preparation module 258 is delivered to and from PDA module 230. PDA module 230 preferably is a personal digital assistant (PDA) or other hand-held hardware device, including, but not limited to, a Palm Pilot, or CE based palm computer, with associated software applications and operating systems. Therefore, PDA module 230 has the form of computer 20 and/or remote computer 49*a* and 49*b*. PDA module 230 includes a data manipulation module 266, a data collection module 268, and a user interface 270. Data manipulation module 266 performs similar functionality to that of data preparation module 258, i.e., transcribe data, compress and decompress data, encrypt and decrypt data, and the like. In the event that data preparation module 258 neither compresses nor encrypts the data transmitted to PDA module 230, data manipulation module 266 is optional.

Data received by data manipulation module 266 is maintained within data collection module 268. Data collection module 268 functions to both store the required data for inventory updating, while storing any updated information that a user may input through user interface 270. Data collection module 268 includes a plurality of tables that store inputted data. Each table within data collection module 268 may include a plurality of fields that may be modified to identify the data stored therein. The field may be modified as a user performs the necessary inventory update process and inputs the modifications and changes through user interface 270, that is preferably a graphical user interface; however user interface 270 may be a textual, interactive, drop-down menu, voice activated, and the like interface.

It can be appreciated by one skilled in the art, however, that various other methods, hardware devices and/or software applications may be used to collect the required data through various user interfaces 270 and data collection modules 268. For example, user interface 270 may allow a user to select choices through pushing buttons, selecting icons, scanning Universal Product Codes (UPC) or other inventory identifier, scanning a bar code with associated numerical value, vocalization of numerical values associated with the inventory items, or through some other method, system, hardware device, or/or software application known to one skilled in the art. Additionally, the structure and functionality of user interface 270 and collection module 268 may be integrated into a single module.

It can be appreciated that the various modules and elements of system 200 may be encapsulated in various hardware and/or software components or modules. For example, the functionality of manipulation module 220 and PDA module 230 may be combined within a single hand-held device with accompanying software. Similarly, in another configuration the functionality of manipulation module 220, PDA module 230, and interface module 250 may be combined into a single module using a PDA device, such as a Palm Pilot. In yet another configuration, system 200 includes one or more storage modules 206, manipulation modules 220, and/or PDA modules 230 that interact and communicate one with another.

Figure 4:
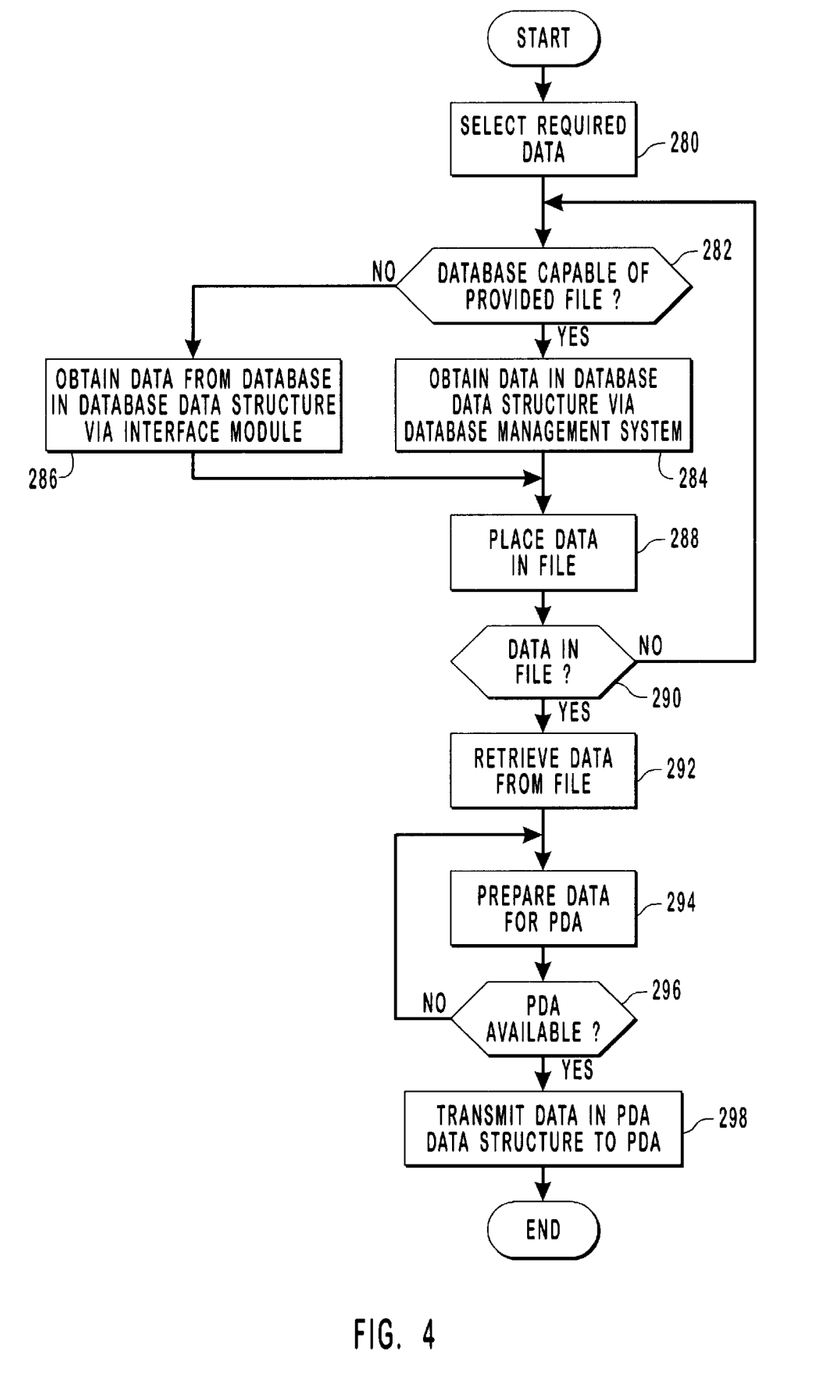
FIG. 4 is a flow diagram illustrating the flow of data from a database to a PDA.
Figure 5:
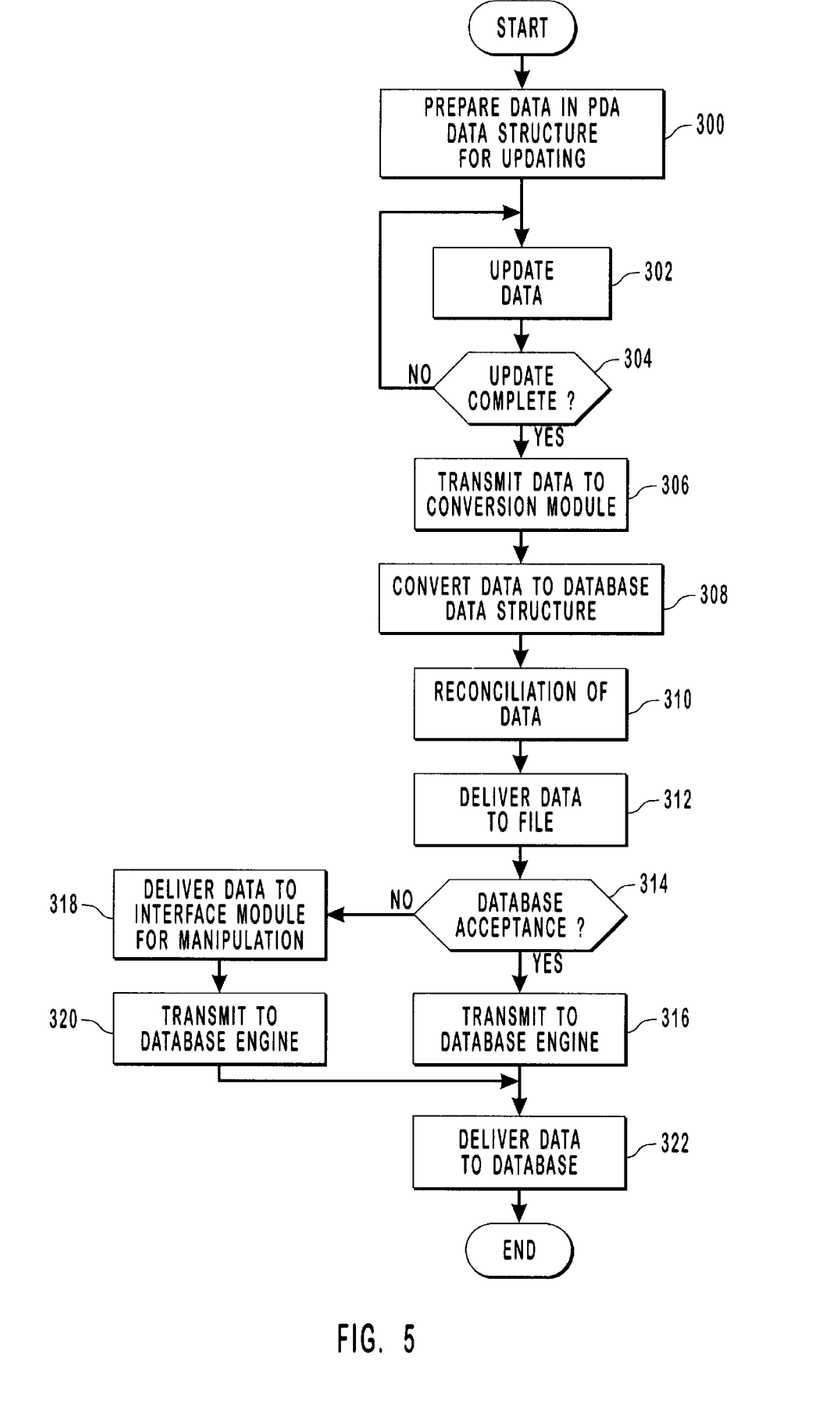
FIG. 5 is a flow diagram illustrating the flow of data from a PDA to a database.

FIGS. 4 and 5 are flow diagrams representing the operational process of one embodiment of the present invention. FIG. 4 depicts the processes and methodology for transferring data maintained in storage module 210 to PDA module 230 through manipulation module 220. In contrast, FIG. 5 represents the flow of updated data, beginning with data in a PDA data structure that passes through manipulation module 220 to be transmitted to storage module 210. It can be appreciated, that the method steps described herein are only illustrative of one method of performing the desired function.

Referring now to FIG. 4, a description of the methodology of the present invention shall be provided as it relates to obtaining inventory information, such as but not limited to medical inventory. The methodology description makes reference to FIGS. 2 and 3, thereby illustrating the method of processing data through the various illustrative modules and components of the present invention.

A user prepares system 200 for performing an inventory update. The user requests data from storage module 206, either through PDA module 230 or directly through manipulation module 220, as represented by block 280. When enterprise resource planning application 244 is capable of creating data file 246, enterprise resource planning application 244 through database management system 242 retrieves the requested data from database 240, as represented by block 284. In the event that enterprise resource planning application 244 is incapable of generating data file 246, interface module 250 gathers the inventory data from database 240 (block 286). Once the data, having a storage data structure, is gathered either by enterprise resource planning application 244 and database management system 242 or interface module 250, the data is stored within data file 246, as depicted by block 288.

It can be appreciated by one skilled in the art, that storage module 206 and/or data control module 210 may perform the steps depicted by decision blocks 282, 286, 284, and 288. It is preferred that preceding implementation of the present invention, whether in an existing system or a proposed new system, that a determination be made as to the capability of the existing or proposed database management system 242 and enterprise resource planning application 244. If enterprise resource planning application 244 is capable of generating data file 246, data control module 210 is optionally devoid of interface module 250 and method step 286 is optionally eliminated. If, however, enterprise resource planning application 244 is incapable of generating data file 246, then data control module 210 or storage module 206 includes interface module 250 and the method step 284 is optionally eliminated.

Once the data has been gleaned from database 240 (FIG. 3), the data is stored within data file 246 as represented by block 286. Manipulation module 220 continually or periodically verifies whether data is stored in data file 246, as represented by decision block 290. As such, until data is placed within data file 246, manipulation module 220 continues to answer "no" to decision block 290. Upon insertion of data into data file 246, manipulation module 220, and more specifically data retrieval/request module 252 (FIG. 3) retrieves data from data file 246 as depicted by block 292. It may be appreciated by one skilled in the art that instead of a batch process, various other types of computing operations may be used to perform the desired function of requesting and receiving data from database 240, such as but not limited to interactive or transaction processing.

Upon data retrieval, the data is stripped, compressed, formatted, encrypted, and generally converted from a storage data structure to a PDA data structure, as represented by block 294. In this way, the data is prepared for transmittal to PDA module 230 (FIG. 3).

Once preparation has occurred, manipulation module 220 identifies whether a PDA device is available or prepared to receive the information. In the case where PDA module 230 incorporates a Palm Pilot hardware device and associated operating software, manipulation module 220 verifies that the Palm Pilot is located within a cradle and prepared to synchronize or hotsync with manipulation module 220 for data transmission. One method of the function depicted in decision block 296 includes the pushing of a button on the Palm Pilot cradle that signals data preparation module 258 (FIG. 3) to deliver the data to the PDA module 230.

It can be appreciated by one skilled in the art, that various other tests, including hardware and/or software modules, may be utilized to identify whether the specific hardware device is prepared for receiving a data transmission. For example, the PDA may include contacts that engage with complementary contacts formed in the PDA's cradle that activate or initiate hardware and/or software components, thereby verifying the preparedness of manipulation module 220 and PDA module 230 for data transmission and reception. In another configuration, PDA module 230 incorporates a signed generator that transmits a coded signal to manipulation module 220 to initiate data transfer.

When decision block 296 answers "yes," data transmission may occur. Data transmission may utilize serial or parallel ports, wireless transmission, microwave transmission, radio transmission, infrared transmission, or such other types of transmission, or other connections as may be known by one skilled in the art.

FIG. 5 illustrates an exemplary method or process by data by user transmitted to database 240. Once data is transmitted to PDA module 230 data preparation occurs before updating thereof, as represented by block 300. Data preparation may include the compression or decompression, encryption or decryption of the data and delivery of the data to data collection module 268 (FIG. 3). Data collection module 268 reformats and/or manipulates the data to a configuration suitable for updating via user interface 270 of FIG. 3.

Alternatively, data collection module 268 merely stores the data that is pre-formatted. When the data is prepared, updating of the data may be performed, and more specifically updating of the inventory information such as but not limited to new item numbers, quantities "on hand," quantities required, and such other information as required by those seeking inventory information, as depicted by block 302.

Once updating is completed, as depicted by decision block 304, the data is prepared, such as compressed as encrypted in preparation for and transmittal to the manipulation module 220, as depicted by block 306. Manipulation module 220, upon receiving the data in PDA data structure form, converts the data into database data structure form, as depicted by block 308. Upon conversion of the data, a reconciliation of the updated data with the data contained within database 240 occurs, as referenced by block 310. Reconciliation may also include the generation of various reports, such as but not limited to statistical reports of PDA usage, such as time of use, areas counted, estimated number of pick tickets, types and number of materials and inventory required, information on inventory "on hand," when the PDA device was checked out and returned, and various other requirements as needed by users and those utilizing the beneficial characteristics and functions of the present invention.

Once all necessary or specified reconciliation activities are performed the updated data is prepared and delivered to data file 246, as represented by block 312. Preparation of the data may or may not include the compression and encryption of the data before transmittal. Although it is preferred that the data be compressed to reduce transmission times and complexity, it may be appreciated by one skilled in the art that the principals of the present invention may also be used for uncompressed data transmission.

The data contained within data file 246 is retrieved by, alternatively, portions of enterprise resource planning application 244 and/or database management system 242, such that the associated database engine may store and update database 240 (block 316) or delivered to interface module 250 for manipulation (block 318, 320) before delivery and updating of database 240, as depicted by block 322.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system having a database containing original data that is accessible through a combination of a database management system and a resource planning application, a method for gathering and updating the original data, the method comprising the steps of:

collecting PDA data with a PDA module, wherein the PDA module stores the PDA data, the PDA module executing on a PDA device;

manipulating the PDA data at the PDA device;

transmitting the PDA data to a manipulation module from the PDA module, wherein the manipulation module converts the PDA data to database data; and storing the database data in the database by way of an interface module that directly creates, reads, accesses, updates, deletes, selects, and modifies the original data stored in the database without interfacing with the database management system and the resource planning application so that the database data updates the original data.

2. A method as defined in claim 1, wherein the step of collecting PDA data further comprises the step of preparing the PDA data for transmission by the PDA device.

3. A method as defined in claim 1, wherein the step of collecting PDA data further comprises the step of gathering PDA data via a graphical user interface.

4. A method as defined in claim 1, wherein the step of transmitting the PDA data further comprises the steps of:
retrieving the PDA data from a data manipulation module of the PDA device; and
delivering the PDA data to the manipulation module.

5. A method as defined in claim 4, further comprising a step of preparing the database data for delivery to a data control module, the database data being stored in a data file.

6. A method as defined in claim 1, wherein the step of storing the database data at the database further comprises the steps of:
retrieving a data file from the manipulation module; and
delivering the data file directly to the database by way of the interface module of a data control module, the interface module delivering the data file to the database without delivering the data file to a database management system of the database.

7. A method as defined in claim 1, further comprising the step of providing user request information representative of the comparison between the PDA data and the original data.

8. In a system having a database containing original data having a database data structure, a method for manipulating the original data though the use of at least one PDA module, the method comprising the steps of:
collecting PDA data representative of inventory information with a PDA device via a user interface, wherein a data collection module within the PDA module stores the PDA data in a PDA data structure, the PDA module executing on the PDA device and wherein the user interface is an interface selected from the group consisting of a graphical user interface, an interactive user interface, a voice recognition user interface, and a textual user interface;
preparing the PDA data, at and under the control of the PDA, stored in the collection module for transmission to a manipulation module, wherein preparing the PDA data comprises compressing and formatting the PDA data;
transmitting the PDA data from the data collection module to the manipulation module, wherein the manipulation module converts the PDA data having a PDA data structure to database data having the database data structure such that the PDA data is database data; and
storing the database data in the database by way of an interface module such that the database data updates the original data.

9. A method as defined in claim 8, wherein the step of transmitting the PDA data further comprises the steps of:
retrieving the PDA data from the data collection module;
preparing the PDA for delivery to the manipulation module; and
transmitting the PDA data to the manipulation module.

10. A method as defined in claim 9, further comprising the step of verifying that the manipulation module is available for transmittal of the PDA data.

11. A method as defined in claim 9, wherein the step of retrieving the PDA data comprises:
obtaining the PDA data form a data compression module of the PDA device, wherein the PDA data is compressed and formatted; and
decompressing and reformatting the PDA data.

12. A method as defined in claim 8, further comprising a step of delivering the database data to a data file of a data control module, the data file being accessible by the database.

13. A method as defined in claim 8, wherein the collecting step and converting step are performed on the PDA device.

14. A method as defined in claim 8, further comprising the step of providing user request information representative of the PDA data in the PDA data structure.

15. A method as defined in claim 14, wherein the user request information is further representative of the usage of the PDA device and analysis of the comparison of the PDA data converted to the database data with the database data stored in the manipulation module.

16. A method as defined in claim 8, wherein the step of storing the database data further comprises the steps of:
retrieving the database data from the manipulation module; and
delivering the database data to the database.

17. A method as defined in claim 16, wherein the step of retrieving the database data comprises the steps of:
preparing the database data for storing in a data file;
transmitting the database data to the data file; and
retrieving the data file.

18. A computer-readable medium having computer-executable instructions for performing the steps recited in claim 8.

19. In a system having a database containing inventory data having a database data structure, the system in communication with one or more PDA devices, a method for gathering and updating the inventory data though the use of the one or more PDA devices, the method comprising the steps of:
collecting PDA data with the one or more PDA devices via a user interface, wherein each of the PDA devices is executing a PDA module that stores the PDA data, having a PDA data structure, in a data collection module and wherein the user interface is a user interface selected from the group of interfaces consisting of a graphical user interface, an interactive user interface, a voice recognition user interface, and a textual user interface;
manipulating the PDA data stored in the data collection module at and under the control of the PDA device for transmission to a manipulation module, wherein preparing the PDA data comprises compressing and formatting the PDA data in the PDA data structure;
retrieving by the manipulation module the PDA data, wherein the manipulation module converts the PDA data having a PDA data structure to database data having the database data structure; and
storing the database data in the database by way of an interface module that directly creates, reads, accesses, updates, deletes, selects, and modifies the original data stored in the database without interfacing with the database management system and the resource planning application so, such that the database data updates the inventory data.

20. A method as defined in claim 19, wherein the step of retrieving the PDA data further comprises the steps of:
verifying that the manipulation module is available for transmittal of the PDA data;
obtaining compressed and formatted PDA data form a data compression module of the PDA device; and
decompressing and reformatting the PDA data.

21. A method as defined in claim 20, further comprising a step of verifying the PDA data, the method comprising:

retrieving the PDA data from the manipulation module;
converting the PDA data into the database data;
reconciling the converted database data with data stored in the database.

22. A method as defined in claim 21, wherein the step of preparing the database data further comprises the step of storing the database data in a data file.

23. A method as defined in claim 22, wherein the collecting step and converting step are performed on the PDA device.

24. A method as defined in claim 23, wherein the step of storing the database data further comprises the steps of:
retrieving the database data from the manipulation module; and
delivering the database data to the database.

25. A method as defined in claim 24, wherein the step of retrieving the database data comprises the steps of:
preparing the database data for storing in a data file;
transmitting the database data to the data file; and
retrieving the data file.

26. A computer-readable medium having computer-executable instructions for performing the steps recited in claim 19.

27. A computer program product for implementing a method for transceiving data between a database and a PDA device, the computer program product comprising:
at least one computer readable medium carrying computer-executable instructions for implementing the method, wherein the computer-executable instructions comprise:
program code means for collecting PDA data with PDA module executing on the PDA device, wherein the PDA module stores the PDA data in a PDA data structure and the PDA data is representative of at least one of changes, modifications, deletions or additions to data received by the PDA device from the database;
program code means for transmitting the PDA data to a manipulation module from the PDA device, wherein the manipulation module converts the PDA data having a PDA data structure to data having a database data structure such that the PDA data is formatted as database data; and
program code means for storing the database data in the database by way of an interface module that directly creates, reads, accesses, updates, deletes, selects, and modifies data currently in the database with the PDA data without interfacing with a database management system and a resource planning application.

28. A computer program product as recited in claim 27, wherein the program code means for collecting the PDA data and the program code means for transmitting the PDA data are contained on one of the at least one computer readable medium.

29. A computer program product as recited in claim 27, wherein the program code means for collecting the PDA data comprises program code means for preparing the stored PDA data for transmission to the manipulation module.

30. A computer program product as recited in claim 27, further comprising program code means for storing the database data in a data file.

31. A computer program product as recited in claim 27, further comprising program code means for providing user request information representative of the PDA data in the PDA data structure.

32. A computer program product as recited in claim 27, wherein the program code means for storing the database data further comprises program code means for:

retrieving the data file from the manipulation module; and
delivering the data file to the database.

33. In a system having a database containing original data, a method for gathering and updating the original data, the method comprising the steps of:
collecting PDA data with a PDA module executing on a PDA device, wherein the PDA module stores the PDA data that is representative of at least one of changes, additions, or deletions to at least a portion of the original data received by the PDA device;
upon manipulating the PDA data at and under the control of the PDA device, transmitting the PDA data to a manipulation module from the PDA module, wherein the manipulation module converts the PDA data to database data; and
storing the database data in the database by way of a data control module that is adapted to update the original data using the database data, wherein the data control module directly creates, reads, accesses, updates, deletes, selects, and modifies the original data stored in the database without interfacing with a database management system and a resource planning application of the system.

34. A method as defined in claim 33, further comprising a step of reconciling the database data with the original data.

35. A method as defined in claim 33, wherein the step of collecting PDA data further comprises the step of preparing the PDA data for transmission by the PDA device.

36. A method as defined in claim 33, wherein the step of collecting PDA data further comprises the step of gathering PDA data via at least one of a graphical user interface, an interactive user interface, a voice recognition user interface, or a textual user interface.

37. A method as defined in claim 33, further comprising a step of storing the database data in a data file.

38. A method as defined in claim 33, further comprising the step of providing user request information representative of the comparison between the PDA data and the original data.

39. A method as defined in claim 33, wherein the step of storing the database data further comprises the steps of:
delivering the database data to the database management system if the database management system is capable of receiving the database data from the manipulation module, the data base management system being capable of delivering the database data to the database.

40. In a system having a database containing original data having a database data structure, a method for manipulating the original data through the use of at least one PDA module, the method comprising the steps of:
collecting PDA data with a PDA device via a user interface, wherein a data collection module within the PDA module stores the PDA data in a PDA data structure, the PDA module executing on the PDA device and wherein the user interface is an interface selected from the group consisting of a graphical user interface, an interactive user interface, a voice recognition user interface, and a textual user interface;
preparing the PDA data stored in the collection module at and by the PDA device for transmission to a manipulation module, wherein preparing the PDA data comprises compressing and formatting the PDA data;
transmitting the PDA data from the data collection module to the manipulation module, wherein the manipulation module converts the PDA data having a PDA data structure to database data having the database data structure such that the PDA data is database data; and
storing the database data in the database by directly creating, reading, accessing, updating, deleting, selecting, and modifying the original data stored in the database without interfacing with a database management system and a resource planning application of the system, such that the database data updates the original data.

41. A method as recited in claim 40, wherein the step of storing the database data comprises delivering the database data to the database by way of a data control module.

42. A method as recited in claim 41, wherein said data control module comprises at least one of an interface module and a resource planning application.

43. A method as recited in claim 42, wherein the step for storing the database data comprises delivering the database data to the database through the interface module.

44. A method as defined in claim 40, wherein the step of transmitting the PDA data further comprises the steps of verifying that a manipulation module is available for transmittal of the PDA data.

45. A method as defined in claim 44, wherein the step of retrieving the PDA data comprises:

obtaining the PDA data form a data compression module of the PDA device, wherein the PDA data is compressed and formatted; and decompressing and reformatting the PDA data.

46. A method as defined in claim 45, further comprising a step of storing the database data in a data file.

47. A method as defined in claim 40, wherein the collecting step and converting steps are performed on the PDA device.

48. A method as defined in claim 40, further comprising a step of providing user request information representative of the PDA data in the PDA data structure.

49. A method as defined in claim 48, wherein the user request information is further representative of the usage of the PDA device and analysis of the comparison of the PDA data converted to the database data with the database data stored in the manipulation module.

50. A method as defined in claim 40, wherein the step of storing the database data further comprises the steps of:

retrieving the database data from the manipulation module; and delivering the database data to the database.

51. A method as defined in claim 50, wherein the step of retrieving the database data comprises the steps of:

preparing the database data for storing in a data file;

transmitting the database data to the data file; and retrieving the data file.

\* \* \* \* \*